(12) United States Patent
Takahashi

(10) Patent No.: US 7,839,260 B2
(45) Date of Patent: Nov. 23, 2010

(54) CONTROL UNIT OF SHAPE MEMORY ELEMENT ACTUATOR AND METHOD OF CONTROLLING SHAPE MEMORY ELEMENT ACTUATOR

(75) Inventor: Masaya Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 217 days.

(21) Appl. No.: 12/259,792

(22) Filed: Oct. 28, 2008

(65) Prior Publication Data

US 2009/0108779 A1    Apr. 30, 2009

(30) Foreign Application Priority Data

Oct. 29, 2007    (JP)    ............... 2007-280407

(51) Int. Cl.
- H01H 37/48    (2006.01)
- H01H 71/18    (2006.01)
- H01H 37/46    (2006.01)
- F02G 1/04    (2006.01)
- G01K 1/00    (2006.01)
- G01R 27/08    (2006.01)

(52) U.S. Cl. .............. 337/394; 337/382; 337/140; 60/527; 60/528; 374/208; 324/691

(58) Field of Classification Search .......... 337/394, 337/382, 140, 2; 60/527–528; 374/208; 324/691

See application file for complete search history.

(56) References Cited

U.S. PATENT DOCUMENTS 4,884,557 A * 12/1989 Takehana et al. ............ 600/145
4,977,886 A * 12/1990 Takehana et al. ............ 600/151
5,531,664 A *  7/1996 Adachi et al. ............... 600/149
5,629,662 A *  5/1997 Floyd et al. .................. 337/36

(Continued)

FOREIGN PATENT DOCUMENTS

JP    1982-141704    9/1982

(Continued)

OTHER PUBLICATIONS

Only of Japanese Patent Application Publication No. 61-019980 dated Jan. 28, 1986.

(Continued)

Primary Examiner—Jayprakash N Gandhi
Assistant Examiner—Bradley H Thomas
(74) Attorney, Agent, or Firm—Scully, Scott, Murphy & Presser, P.C.

(57) ABSTRACT

At the time of start of usage, a voltage to be applied to a shape memory alloy wire 102 by a feedback control circuit 120 is set to a first voltage value (step S1), and at a limit resistance value detection step, (the feedback control circuit) measures a limit resistance value when the shape memory alloy wire 102 can be contracted (step S2), and upon storing the limit resistance value, a value of the maximum voltage to be input by the feedback control circuit 120 is set to a second voltage value (step S3). At an input electric power optimization step, a target resistance value is indicated, and the feedback control is carried out such that the resistance value indicated is not lower than the limit resistance value (step S4). Thereafter, voltage is stopped at the time of stopping the use of the actuator.

2 Claims, 7 Drawing Sheets

U.S. PATENT DOCUMENTS

| | | | |
|---|---|---|---|
| 6,049,267 A * | 4/2000 | Barnes et al. | 337/123 |
| 6,239,686 B1 * | 5/2001 | Eder et al. | 337/382 |
| 6,374,608 B1 * | 4/2002 | Corris et al. | 60/528 |
| 6,574,958 B1 * | 6/2003 | MacGregor | 60/527 |
| 6,972,659 B2 * | 12/2005 | von Behrens et al. | 337/139 |
| 6,981,374 B2 * | 1/2006 | von Behrens et al. | 60/527 |
| 7,159,398 B1 * | 1/2007 | Bushnell et al. | 60/529 |
| 7,555,900 B1 * | 7/2009 | Vallance et al. | 60/528 |
| 7,614,228 B2 * | 11/2009 | Hamaguchi et al. | 60/527 |
| 2004/0261411 A1 * | 12/2004 | MacGregor | 60/527 |
| 2005/0016637 A1 * | 1/2005 | Yambe et al. | 148/402 |
| 2006/0207250 A1 * | 9/2006 | Komori et al. | 60/527 |
| 2008/0282696 A1 * | 11/2008 | Wada et al. | 60/528 |
| 2009/0009656 A1 * | 1/2009 | Honda et al. | 348/372 |
| 2010/0060776 A1 * | 3/2010 | Topliss et al. | 348/340 |
| 2010/0074608 A1 * | 3/2010 | Topliss | 396/133 |
| 2010/0117663 A1 * | 5/2010 | Herrera et al. | 324/679 |

FOREIGN PATENT DOCUMENTS

| | | |
|---|---|---|
| JP | 5-87677 | 12/1993 |
| JP | 2006-183564 | 7/2006 |

OTHER PUBLICATIONS

Kodama, K. et al., "Position Control of Shape Memory Alloy Actuator Using Hysteresis Model," University of Tsukuba, Institute of Engineering Mechanics and Systems, (Dec. 1992), pp. 120-125, vol. 65.

* cited by examiner

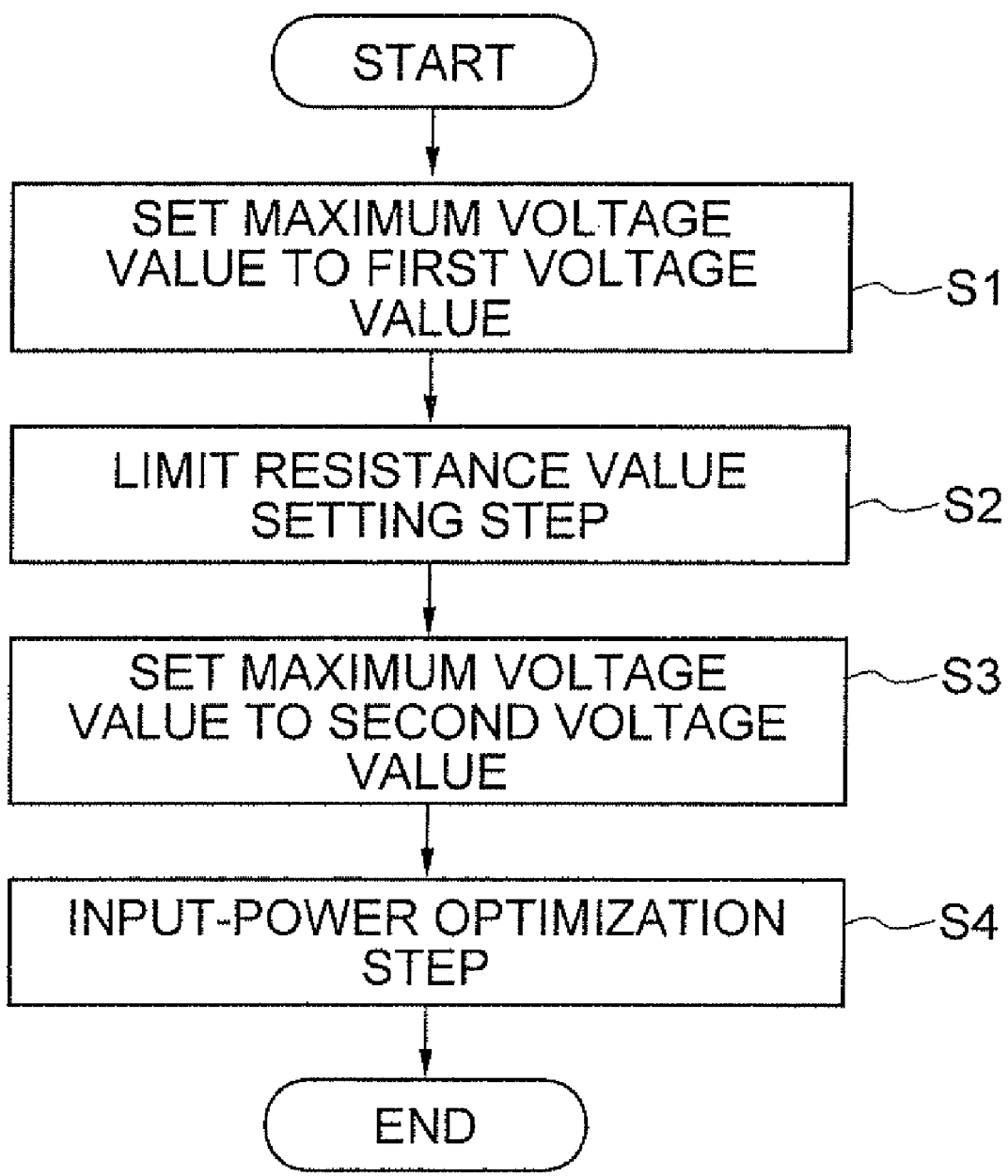

CONTROL UNIT OF SHAPE MEMORY ELEMENT ACTUATOR AND METHOD OF CONTROLLING SHAPE MEMORY ELEMENT ACTUATOR

CROSS-REFERENCE TO RELATED APPLICATION

The present application is based upon and claims the benefit of priority from the prior Japanese Patent Application No. 2007-280407 filed on Oct. 29, 2007; the entire contents of which are incorporated herein by reference.

BACKGROUND OF THE INVENTION

1. Field of the Invention

The present invention relates to an actuator which is driven by a shape memory element.

2. Description of the Related Art

A shape memory element undergoes a phase transition due to a change in a temperature, and has a change of shape. An actuator in which, the shape change of the shape memory element is used, has superior characteristics of a small size and a light weight.

For instance, in Japanese Patent Application Laid-open Publication No. 1982-141704, a technology in which, the shape of a shape memory element is changed by supplying an electric power to the shape memory element, and a resistance value which changes with the shape change is detected, and by controlling an expansion and a contraction of the shape memory element, the actuator also functions as a sensor, has been disclosed.

Moreover, in Japanese Patent Application Laid-open Publication No. 2006-183564, an example of suppressing an excessive power supply to the shape memory element at the time of driving, by providing a limit condition to a control at the time of controlling upon by detecting the resistance value of the shape memory element has been introduced. According to this method, it is possible to achieve a highly reliable shape memory alloy actuator by suppressing an excessive heat to the shape memory alloy.

When the shape memory alloy is a wire material, a magnitude of the shape change of the shape memory alloy related to the drive is proportional to a length of the shape memory alloy. Consequently, for increasing a driving stroke, it is necessary to increase the length of the shape memory alloy.

For example, as in Japanese Patent Application Kokoku Hei 5-87677, the wire material of the shape memory alloy is inserted into a flexible tube having an insulating property. One end of the wire is fixed together with the flexible tube, and is let to be a fixed portion, and the other end of the wire is let to be a movable portion. By making such an arrangement, the movable portion performs its function even when the wire material of the shape memory alloy is bent together with the flexible tube. Therefore, in a unit in which, there is a tube site (portion) having a bending property, other than a driving portion, the shape memory alloy is incorporated in a tube position, and a long shape memory element is accommodated, it is possible to increase the driving stroke, which is an advantage.

In an actuator in which the shape memory alloy of a wire material is used, in a case of increasing the driving stroke, and controlling the drive of a movable body by controlling the expansion and the contraction of the shape memory alloy, a structure in which, the technology described in Japanese Patent Application Laid-open Publication No. 1982-141704 and Japanese Patent Application Kokoku Hei 5-87677 is let to be the basis, and the control is carried out by detecting the resistance value of the shape memory alloy, and the shape memory alloy is interpolated into the flexible tube is assumed.

Moreover, as in the technology described in Japanese Patent Application Laid-open Publication No. 2006-183564, providing the limit condition to the control for avoiding the excessive heating when the electric power is supplied at the time of controlling the expansion and the contraction of the shape memory alloy by detecting the resistance value is assumed Here, the resistance value of the shape memory alloy might change with the lapse of time, due to an effect of a change in an external environment, and a residual stress due to the usage. Consequently, for avoiding the excessive heating due to passing the electric supply, it is more desirable to reset the limit condition by actually letting the shape memory alloy to be contracted by heating at the beginning of the use every time, as it is possible to drive with the accurate limit condition every time, and the stability is improved.

When the control unit is provided with a step of setting the limit condition at the time of use every time as described above, in a flexible shape memory element actuator in which, a large driving stroke is secured, a frictional force added to the shape memory element by a magnitude of a bending angle becomes substantial. For this reason, for carrying out a step of setting a limit resistance value in a short time, it is necessary to increase an applied voltage in the limit resistance value setting step such that, the shape memory alloy undergoes a predetermined thermal expansion and contraction in a short time.

However, as it has been described in reference literature 'Position control of SMA actuator in which hysteresis model is used' (No. 640 by Kazuyuki Kodama, volume 65 (1992-12) of Journal of the Japan Society of Mechanical Engineers (Edition C)), when a voltage input is increased, or in other words, when a voltage gain is increased at the time of controlling the resistance value of the shape memory element to a predetermined target resistance value by a resistance feedback control for stopping a position of the movable body, there is a possibility that a vibration of the movable body becomes substantial when the resistance value of the shape memory element is close to the target resistance value.

Moreover, when the resistance value of the shape memory alloy does not attain the target resistance value at the time of moving the movable body by displacing the shape memory element up to a limit of a movable range, and stopping at a position of a mechanical restraint, even when the limit condition is set, in the resistance feed back control, an excess electric power equivalent to the amplitude of vibration is supplied to the shape memory element. Therefore, the shape memory element is heated excessively, and there is a possibility that a deterioration of performance of the shape memory element advances.

SUMMARY OF THE INVENTION

The present invention is made in view of the abovementioned circumstances, and an object of the present invention is to provide a control unit and a method of controlling an actuator in which, a bendable shape memory element which scans in a short time a limit condition of control at the time of start of usage every time, and suppresses an amplitude of a movable body at the time of driving the actuator, and prevents deterioration of the shape memory element due to the excessive electric power supply, is used.

To solve the abovementioned issues, and to achieve the object, according to the present invention, there is provided a method of controlling a shape memory element actuator including a tube member which is hollow and a shape memory element which is inserted through the tube member, where, one end of the tube member and one end of the shape memory element are fixed, and the other end of the shape memory element is mechanically linked to a driven body, and the other end of the tube member is fixed to a supporting member, and further including a force imparting member which exerts an external force in a direction opposite to a direction of shape change, by heating of the shape memory element, and a stopper which limits a movement of a driven body to a predetermined position in a direction of movement of the driven body, by the heating of the shape memory element, which is a method of controlling by passing an electric current through the shape memory element, and changing a shape of the shape memory element by changing a temperature of the shape memory element, and changing relative positions of the movable body, and one end of the tube member, on a side which is not fixed to the shape memory element, including a limit resistance value detection step of storing in a control unit a resistance value when a resistance value of the shape memory element in a predetermined time interval has not changed by a predetermined resistance value step width, as a limit resistance value which limits a setting range of a first target resistance value, and an input electric power optimization step of optimizing an electric power setting which is to be input to the shape memory element by a feedback resistance circuit by changing an input voltage pattern such that, the resistance value is in a predetermined acceptable range, with respect to the target resistance value which is set as a first target resistance value, and the limit resistance value detection step and the input electric power optimization step are carried out upon moving the driven body by inputting a constant voltage pattern at a predetermined frequency, at the time of using the shape memory element actuator, by using a control means which includes a target resistance value determining means which sets the target resistance value of the shape memory element for moving a predetermined position of the driven body, as the first target resistance value, a resistance value detecting means which detects the resistance value of the shape memory element, and a resistance feedback control circuit which carries out a control of a feedback based on information of the target resistance value and the resistance value, and an input voltage of the voltage pattern at the limit resistance value detection step is input by a first voltage value, and the input voltage at the input electric power optimization step which drives the shape memory element is input by a second voltage value which is smaller than the first voltage value.

Moreover, according to the present invention, there is provided a control unit of a shape memory element actuator including a tube member which is hollow and a shape memory element which is inserted through the tube member, where, one end of the tube member and one end of the shape memory element are fixed, and the other end of the shape memory element is mechanically linked to a driven body, and the other end of the tube member is fixed to a supporting member, and further including a force imparting member which exerts an external force in a direction opposite to a direction of shape change, by heating of the shape memory element, and a stopper which limits a movement of a driven body to a predetermined position in a direction of movement of the driven body, by the heating of the shape memory element, which controls by passing an electric current through the shape memory element, and changing a shape of the shape memory element by changing a temperature of the shape memory element, and changing relative positions of the movable body, and one end of the tube member, on a side which is not fixed to the shape memory element, including a limit resistance value detecting means which stores in a control unit a resistance value when a resistance value of the shape memory element in a predetermined time interval has not changed by a predetermined resistance value step width, as a limit resistance value which limits a setting range of a first target resistance value, and an input electric power optimizing means which optimizes an electric power setting which is to be input to the shape memory element by a resistance feedback circuit by changing an input voltage pattern such that, the resistance value is in a predetermined acceptable range, with respect to the target resistance value which is set as a first target resistance value, and the limit resistance value detecting means and the input electric power optimizing means carries out functions upon moving the driven body by inputting a constant voltage pattern at a predetermined frequency, at the time of using the shape memory element actuator, by using a control means which includes a target resistance value determining means which sets the target resistance value of the shape memory element for moving a predetermined position of the driven body, as the first target resistance value, a resistance value detecting means which detects the resistance value of the shape memory element, and a resistance feedback control circuit which carries out a control of a feedback based on information of the target resistance value and the resistance value, and an input voltage of the voltage pattern by the limit resistance value detecting means is input by a first voltage value, and the input voltage by the input electric power optimizing means which drives the shape memory element is input by a second voltage value which is smaller that the first voltage value.

BRIEF DESCRIPTION OF THE DRAWINGS

FIG. 5 is a flowchart explaining a procedure for a method of controlling carried out by the feedback control circuit in the first embodiment;

DETAILED DESCRIPTION OF THE PREFERRED EMBODIMENTS

An embodiment of a method of controlling a shape memory element actuator according to the present invention, and a control unit of the shape memory element actuator will be described below in detail by referring to the accompanying diagrams. However, the present invention is not restricted to the embodiment described below.

Figure 1:
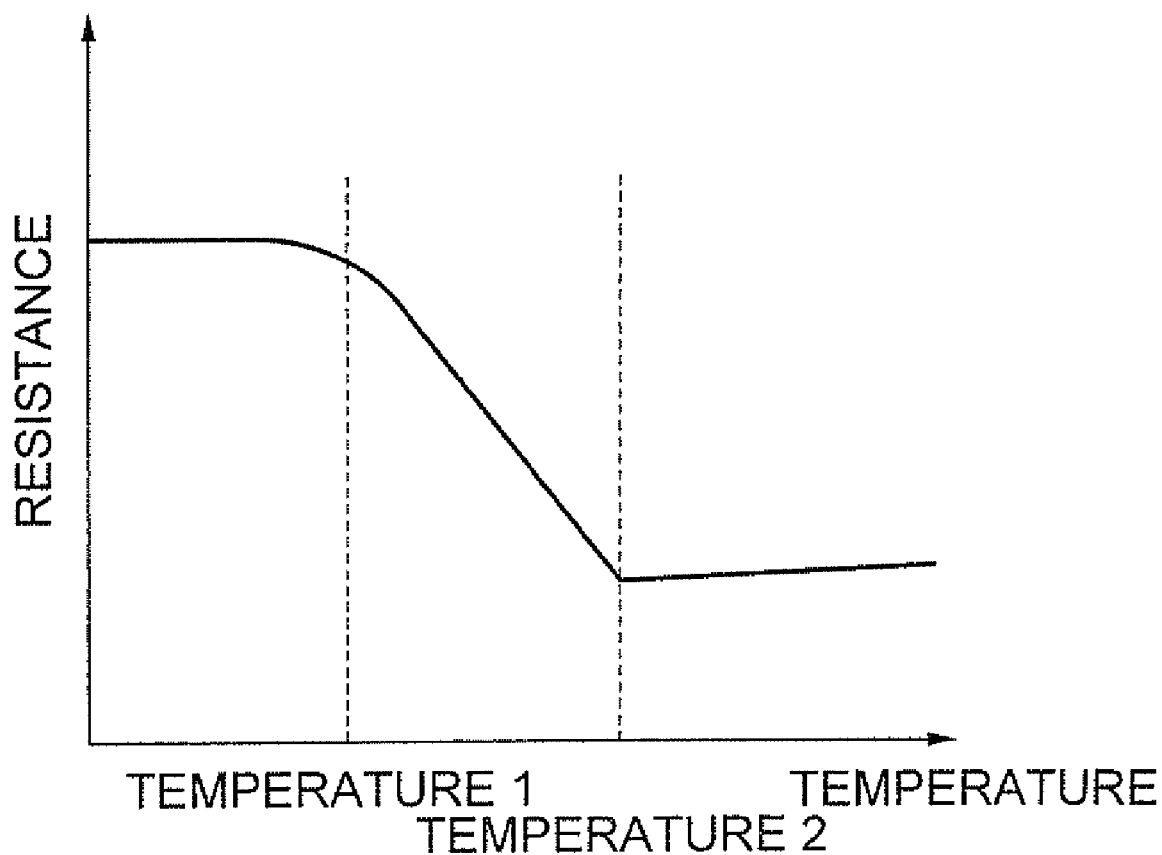
FIG. 1 is a schematic diagram showing temperature-resistance characteristics of a shape memory alloy wire used in a first embodiment according to the present invention.

FIG. 1 is a schematic diagram showing temperature-resistance characteristics of a shape memory alloy wire 102 used in the embodiment of the present invention.

A horizontal axis indicates a temperature and a vertical axis indicates a resistance value of the shape memory alloy wire 102. Temperature 1 described in FIG. 1 denotes a point at which, the shape memory alloy wire 102 starts to undergo a phase transition due to the temperature, and a resistance starts to decrease due to heating, by contraction of a length.

Temperature 2 described in FIG. 1 denotes a point at which, the length of the shape memory alloy wire 102 cannot change due to a mechanical constraint, and the resistance does not change even when heated. Precisely, although the resistance tends to become high when heated to a temperature more than temperature 2 due to an effect of a thermal motion of molecules, it is sufficiently low as compared to a change in the resistance value due to the change in the length of the shape memory alloy wire 102, a point at which it the resistance value does not change any more is expressed.

Figure 2:
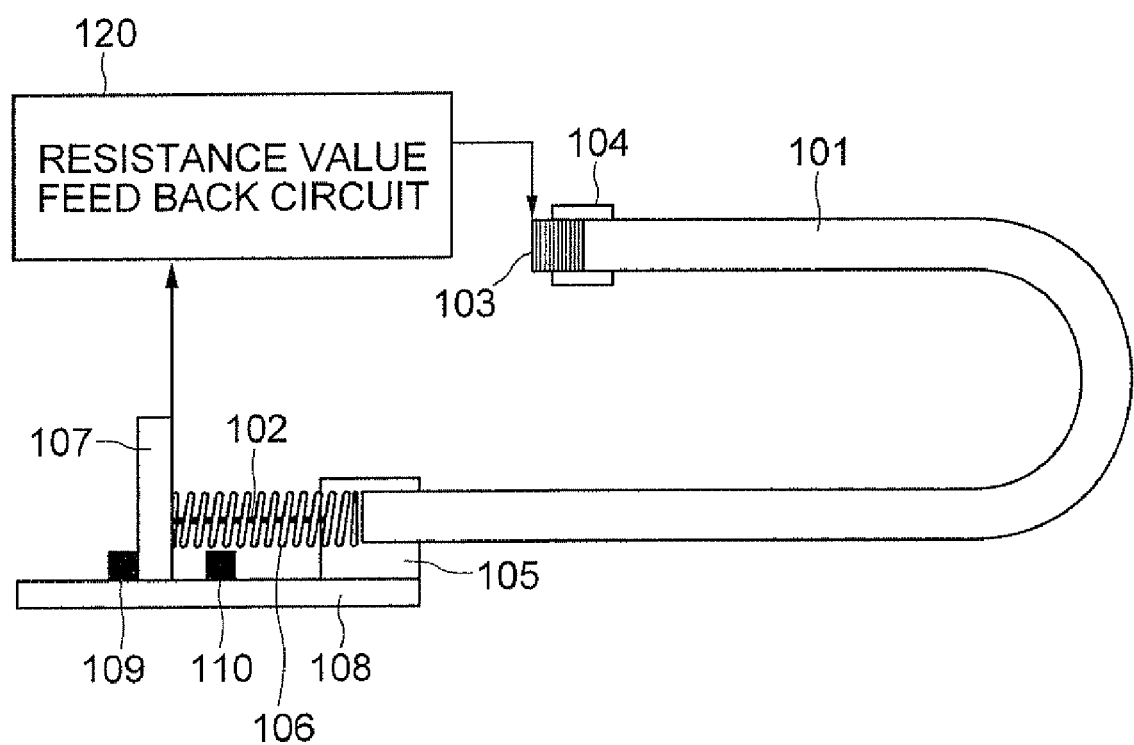
FIG. 2 is a diagram showing an example of a structure of an actuator in which, a shape memory alloy according to the first embodiment is used.
Figure 3:
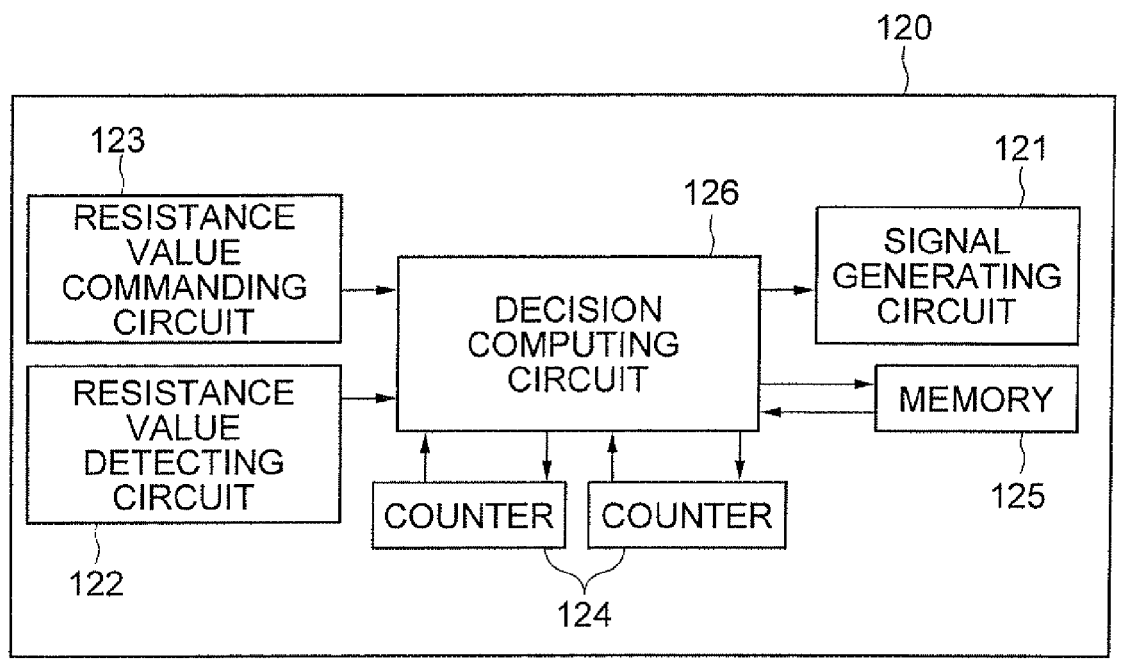
FIG. 3 is a diagram showing an internal structure of a resistance value feedback control circuit which controls driving of the actuator in which the shape memory alloy in FIG. 2 is used.

FIG. 2 is a diagram showing an example of a structure of an actuator in which, a shape memory alloy according to the first embodiment is used. FIG. 3 is a diagram showing an internal structure of a resistance value feedback control circuit which controls driving of the actuator in which the shape memory alloy in FIG. 2 is used.

The actuator in which, a shape memory alloy according to the first embodiment is used, is structured as follows. As shown in FIG. 2, the shape memory alloy wire 102 is inserted through a tube 101. A clamping member 103 is fixed by clamping to one end of the shape memory alloy wire 102, and the clamping member 103 and one end of the tube 101 are joined by an adhesive 104.

The other end of the tube 101 is fixed to a supporting member 105, a hole (not shown in the diagram) through which, the shape memory alloy wire 102 passes is provided to the supporting member 105. One end of a bias spring 106 is fixed to a side of the supporting member 105, opposite to a side to which the tube 101 is fixed, and the other end of the bias spring 106 is fixed to a movable body 107. Moreover, the other end of the shape memory alloy wire 102, upon passing through the tube 101, the supporting member 105, and the bias spring 106, is fixed to the movable body 107.

The supporting member 105 is installed on a base 108, and the base 108 is provided with a first stopper 109 and a second stopper 110. FIG. 2 shows a length of the shape memory alloy wire 102 at a room temperature, and shows a state in which, the movable body 107 is regulated and stopped by the first stopper 109 due to a force imparted by the bias spring 102.

The clamping member 103 is let to be electroconductive, and one end of the shape memory alloy wire 102 is electrically connected to a signal generating circuit 121 of a resistance value feedback control circuit 120, and the other end of the shape memory alloy wire 102 is electrically connected to a resistance value detection circuit 122.

Here, as shown in FIG. 3, the resistance value feedback control circuit 120 functions as a control means according to the present invention, and includes a resistance value commanding circuit 123, a counter 124, a decision computing circuit 126, and a signal generating circuit 121 which outputs an amount of electric power to be supplied which is calculated, to the shape memory alloy wire 102. Here, the judgment computing circuit 126 compares a resistance value which is obtained from a resistance value detecting circuit 122 after elapsing of a predetermined time, and a target resistance value which is recorded in a memory 125, and set by the resistance value commanding circuit 123, and calculates the optimum amount of electric power to be supplied to the shape memory alloy wire 102.

Figure 4A:
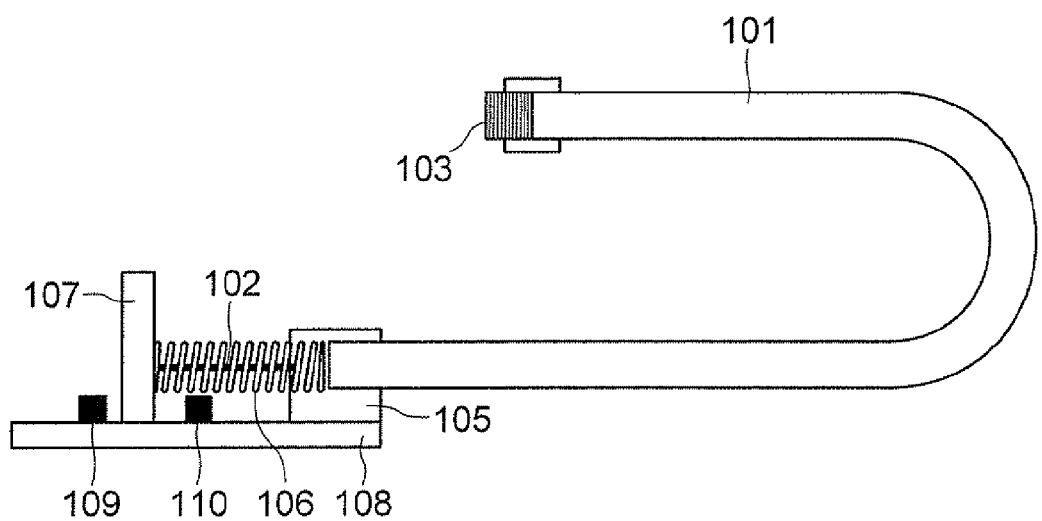
FIG. 4A and FIG. 4B are diagrams in which, a position change of a movable body due to a difference in a state of the shape memory alloy wire shown in FIG. 2 is shown.
Figure 4B:
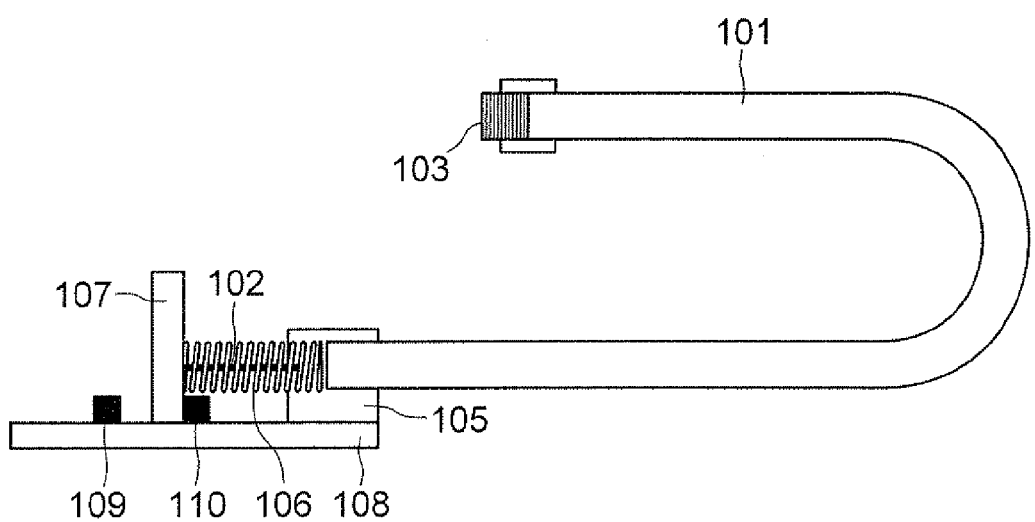

FIG. 4A and FIG. 4B are diagrams in which, a position change of a movable body due to a difference in a state of the shape memory alloy wire 102 shown in FIG. 2 is shown. In FIG. 4A and FIG. 4B, for making the position change of the movable body easily understandable, the resistance value feedback control circuit 120 shown in FIG. 2 is omitted.

FIG. 4A shows a state in which, the shape memory alloy wire 102 undergoes a phase transition due to being heated by passing of an electric power from the resistance value feedback control circuit 120, and a contraction force of the shape memory alloy wire 102 resists the force imparted by the bias spring 106 changing a length thereof, and the movable body 107 undergoes a position change in a direction of contraction of the shape memory alloy wire 102.

FIG. 4B shows a state in which, the movable body 107 is moved substantially in a direction of contraction of the shape memory alloy wire 102 by increasing the electric power to be supplied than in the case in FIG. 4A, and is regulated and stopped by the second stopper 110. At this time, even when the shape memory alloy wire 102 tends to contract further due to heating, the movable body 107 cannot move due to the second stopper 110.

As a result, the shape memory alloy wire 102 also cannot be contracted. The movable body 107 is stopped, but the shape memory alloy wire 102 is in a state of being susceptible to be heated excessively.

FIG. 5 is a flowchart explaining a procedure for a first method of controlling carried out by the feedback control circuit 120 shown in FIG. 3 in the embodiment.

As shown in FIG. 5, with the structure of the actuator shown in FIG. 2, at the time of starting the usage, a value of a voltage to be applied to the shape memory alloy wire 102 by the feedback control circuit 120 is set to a first voltage value (step S1).

Next, at a limit resistance value setting step, a limit resistance value at a limit where the shape memory alloy wire 102 can be contracted with such structure is measured (step S2). The limit resistance value setting step will be described later.

After the limit resistance value is measured, the limit resistance value is stored, and a value of the maximum voltage to be input by the feedback control circuit 120 is set to a second voltage value (step S3).

In this state, at the input electric power optimization step, a target resistance value is indicated, and the feedback control is carried out such that the value indicated is not lower than the limit resistance value (step S4). The input electric power optimization step will be described later. Thereafter, voltage applied is stopped at the time of terminating the use of the actuator.

Figure 6:
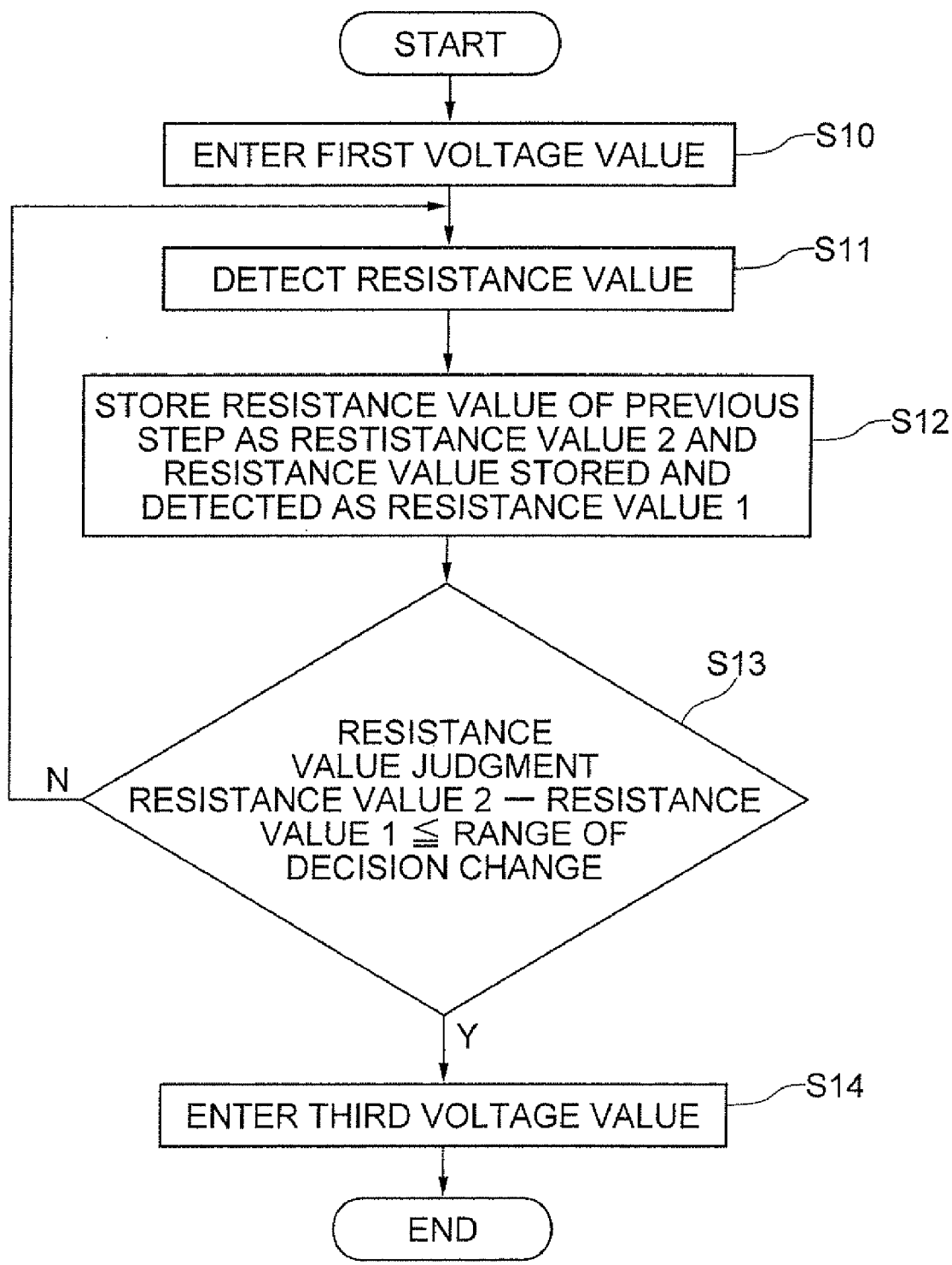
FIG. 6 is a flowchart explaining about a limit resistance value setting step which is executed in the first embodiment.

Next, the limit resistance value setting step of the embodiment will be described by using a flow chart in FIG. 6. To start with, at step S10, a voltage to be applied to the shape memory alloy wire 102 is set to a first voltage (V1). At step S11, the resistance value is measured after a substantially short time. The resistance value which is measured is stored as a resistance value 1 (R1), and the resistance value is measured again after a predetermined time is elapsed. At step S12, the value of R1 is updated by that newly measured value, and R1 of the previous step is stored as a resistance value 2 (R2).

At step S13, R2-R1 is compared with a predetermined range of a change in the resistance value (range of change judged ΔR).

When R2−R1>ΔR, a decrease in the resistance value, in other words, the contraction of the shape memory alloy wire 102 is judged to be continued, and this step is repeated after elapsing further of a predetermined time.

When R2−R1≦ΔR, the contraction of the shape memory alloy wire 102 is judged to have stopped, and the process advances to step S14. At step S14, the voltage is set to a third voltage value V3. Moreover, R1 at this time (at this point of time) is set as the limit resistance value. Here, V3 is a sufficiently smaller value as compared to V1, and may be 0.

In this manner, at the limit resistance value setting step of the embodiment, it is possible to set assuredly the limit resistance value in a short time by heating the shape memory alloy wire 102 in a short time by increasing the value of V1.

Figure 7:
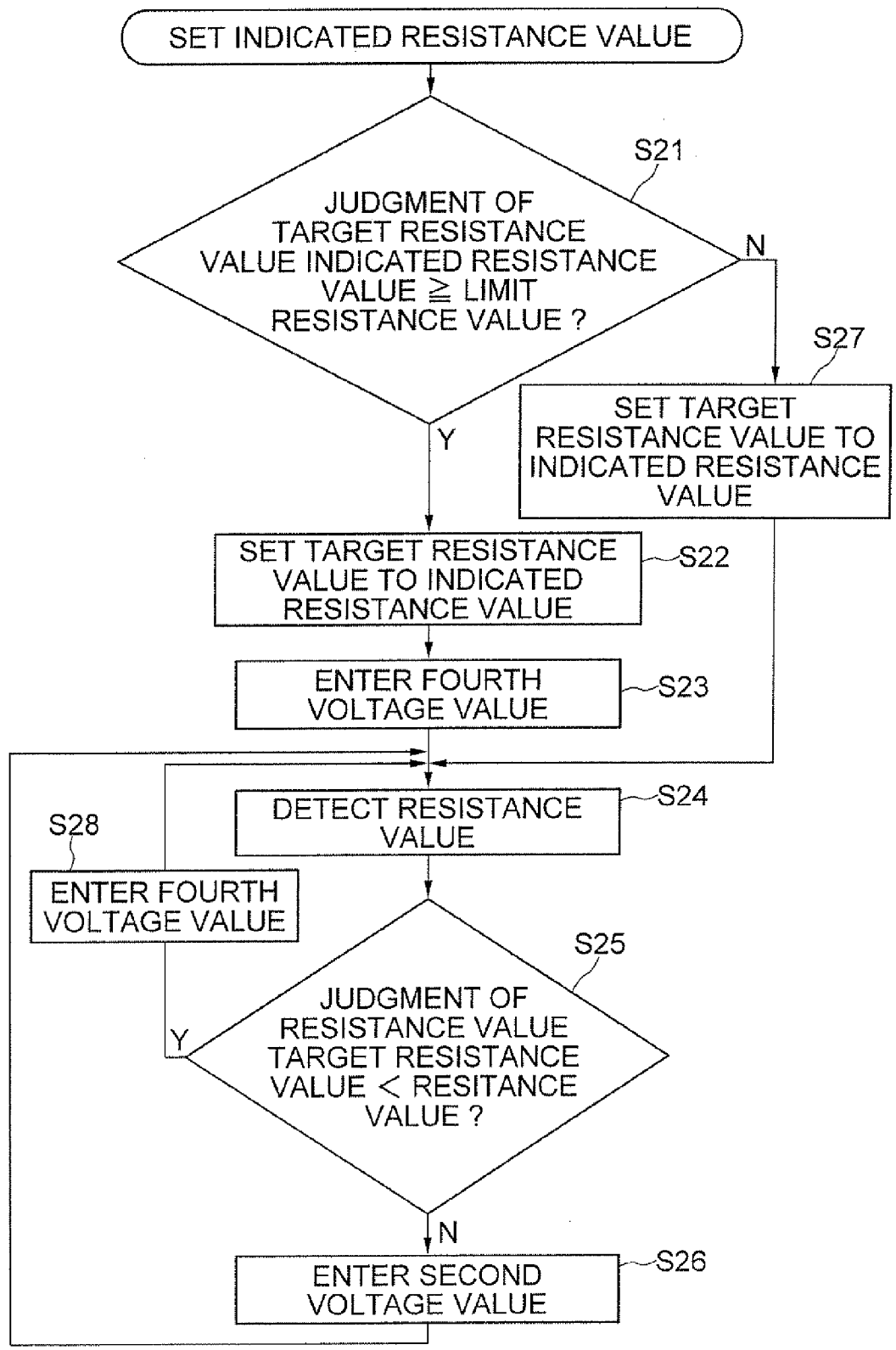
FIG. 7 is a flowchart explaining about an input electric power optimization step which is executed in the first embodiment.

Next, the input electric power optimization step of the embodiment will be described below by using a flowchart in FIG. 7. In the input electric power optimization step, the resistance value of the shape memory alloy wire 102 is kept at a predetermined value. In other words, the input electric power optimization step is a step of controlling a displacement of the shape memory alloy actuator.

To start with, an indicated resistance value (R3) is indicated, and at step S21, it is checked that the indicated resistance value (R3) is a value higher than the limit resistance value R1 which is set earlier. When a judgment result at step S21 is negative, R3 is replaced by R1 (step S27). Substituting R3 by R1 in such manner is equivalent to denoting to displace to a position of the second stopper 110 in FIG. 2.

Next, when the judgment result at step S21 is affirmative, at step S22, the target resistance value is set to the indicated resistance value. Moreover, a fourth voltage V4 is applied to the shape memory alloy wire 102 (step S23). Here, V4 is a sufficiently small value of an extent such that even when V4 is applied for a long time, the shape memory alloy wire 102 is not heated up to a transformation temperature.

In this state, a resistance value Rm of the shape memory alloy is set (step S24). At step S25, the resistance value Rm and the target resistance value R3 are compared. When R3<Rm, a judgment is made that the shape memory alloy actuator has not attained a predetermined displacement, and the process advances to step S26. At step S26, the second voltage value V2 is applied.

Moreover, when R3≧Rm, the shape memory alloy is assumed to have undergone an excessive displacement which is excessively more than the target displacement, and the voltage value V4 is set for lowering the temperature of the shape memory alloy wire 102 (step S28). Here, although the voltage value V2 is a voltage which may cause a phase transformation of the shape memory alloy wire 102 when applied for a long time, is smaller than V1. By repeating this loop at a short cycle, it is possible to control the displacement of the shape memory alloy wire 102 in a predetermined range.

Incidentally, at this time, when the value of V2 is excessively large, the desired resistance value (corresponding to the displacement of the shape memory alloy wire 102) is attained in a short timer but consequentially, since a voltage gain becomes substantial, a possibility of occurrence of vibrational (oscillatory) displacement is high. Consequently, the value of V2 is set such that the vibrational displacement does not occur, or an amplitude of vibration is small to an extent that it does not cause any problem during the actual use.

In this manner, in the method of the embodiment, by making the maximum voltage applied V2 at the input electric power optimization step to be smaller than the maximum voltage applied V1 at the time of setting the limit voltage, it is possible to set the limit resistance value assuredly in a short time, and further to carry out a stabilized displacement control with a small vibrational displacement.

In the method of the embodiment described above, a method of carrying out the displacement control of the shape memory alloy actuator by feedback of the voltage input has been disclosed. However, it is needless to mention that it is possible to control with a similar concept by feed back of input electric power or input electric current.

According to the present invention having the abovementioned structure, it is possible to show the following action and effect.

In other words, by making the voltage value at the input electric power optimization step at the time of driving to be smaller than the value of the voltage input to the shape memory element at the scanning step of the limit resistance value at the time of start of the usage every time, it is possible to carry out the step of scanning the limit resistance value in a short time even when an angle of bending of the tube position is large, and frictional force exerted on the shape memory element is large, and since it is possible to suppress the vibration of the movable body which is a peculiarity of the resistance feedback control, by making the voltage small at the time of driving, a position controllability of the movable body is improved. Moreover, due to the vibration of the movable body being suppressed, it is possible to prevent the excessive electric power equivalent to the amplitude of the movable body from being supplied, and to use the shape memory element stably for a long time at the time of controlling the position of the movable body at the position of the stopper.

As it has been described above, the method of controlling the shape memory element actuator and the control unit of the shape memory alloy actuator according to the present invention are useful as the method of controlling and the control unit of the actuator which drives by the shape memory alloy.

According to the present invention, it is possible to provide a method of controlling and a control unit of an actuator which carries out in a short time, a scanning of a limit condition of control at the time of starting of use every time, suppresses the amplitude of the movable body at the time of driving of the actuator, and which prevents a deterioration of the shape memory element due to the supply of the excessive electric power, and in which, a shape memory element which can be bent is used.

What is claimed is:

1. A method of controlling a shape memory element actuator including a tube member which is hollow and a shape memory element which is inserted through the tube member, where, one end of the tube member and one end of the shape memory element are fixed, and the other end of the shape memory element is mechanically linked to a driven body, and the other end of the tube member is fixed to a supporting member, and further including a force imparting member which exerts an external force in a direction opposite to a direction of shape change, by heating of the shape memory element, and a stopper which limits a movement of the driven body to a predetermined position in a direction of movement of the driven body, by the heating of the shape memory element, which is a method of controlling by passing an electric current through the shape memory element, and changing a shape of the shape memory element by changing a temperature of the shape memory element, and changing relative positions of the driven body, and one end of the tube member, on a side which is not fixed to the shape memory element, comprising:

a limit resistance value detection step of storing in a control unit a resistance value when a resistance value of the shape memory element in a predetermined time interval has not changed by a predetermined resistance value step width, as a limit resistance value which limits a setting range of a first target resistance value; and an input electric power optimization step of optimizing an electric power setting which is to be input to the shape memory element by a feedback resistance circuit by changing an input voltage pattern such that, the resistance value is in a predetermined acceptable range, with respect to the target resistance value which is set as a first target resistance value, wherein the limit resistance value detection step and the input electric power optimization step are carried out upon moving the driven body by inputting a constant voltage pattern at a predetermined frequency, at the time of using the shape memory element actuator, by using a control means which includes a target resistance value determining means which sets the target resistance value of the shape memory element for moving a predetermined position of the driven body, as the first target resistance value, a resistance value detecting means which detects the resistance value of the shape memory element, and a resistance feedback control circuit which carries out a control of a feedback based on information of the target resistance value and the resistance value, and an input voltage of the voltage pattern at the limit resistance value detection step is input by a first voltage value, and the input voltage at the input electric power optimization step which drives the shape memory element is input by a second voltage value which is smaller than the first voltage value.

2. A control unit of a shape memory element actuator including a tube member which is hollow and a shape memory element which is inserted through the tube member, where, one end of the tube member and one end of the shape memory element are fixed, and the other end of the shape memory element is mechanically linked to a driven body, and the other end of the tube member is fixed to a supporting member, and further including a force imparting member which exerts an external force in a direction opposite to a direction of shape change, by heating of the shape memory element, and a stopper which limits a movement of the driven body to a predetermined position in a direction of movement of the driven body, by the heating of the shape memory element, which controls by passing an electric current through the shape memory element, and changing a shape of the shape memory element by changing a temperature of the shape memory element, and changing relative positions of the driven body, and one end of the tube member, on a side which is not fixed to the shape memory element, comprising:

a limit resistance value detecting means which stores in a control unit a resistance value when a resistance value of the shape memory element in a predetermined time interval has not changed by a predetermined resistance value step width, as a limit resistance value which limits a setting range of a first target resistance value; and an input electric power optimizing means which optimizes an electric power setting which is to be input to the shape memory element by a resistance feedback circuit by changing an input voltage pattern such that, the resistance value is in a predetermined acceptable range, with respect to the target resistance value which is set as a first target resistance value, wherein the limit resistance value detecting means and the input electric power optimizing means carries out functions upon moving the driven body by inputting a constant voltage pattern at a predetermined frequency, at the time of using the shape memory element actuator, by using a control means which includes a target resistance value determining means which sets the target resistance value of the shape memory element for moving a predetermined position of the driven body, as the first resistance target value, a resistance value detecting means which detects the resistance value of the shape memory element, and a resistance feedback control circuit which carries out a control of a feedback based on information of the target resistance value and the resistance value, and an input voltage of the voltage pattern by the limit resistance value detecting means is input by a first voltage value, and the input voltage by the input electric power optimizing means which drives the shape memory element is input by a second voltage value which is smaller than the first voltage value.

* * * * *